June 8, 1954
C. DROZYNSKI
2,680,657
TRANSMISSION GEAR-SET SLIDE MOUNTING
Filed March 11, 1950
4 Sheets-Sheet 1
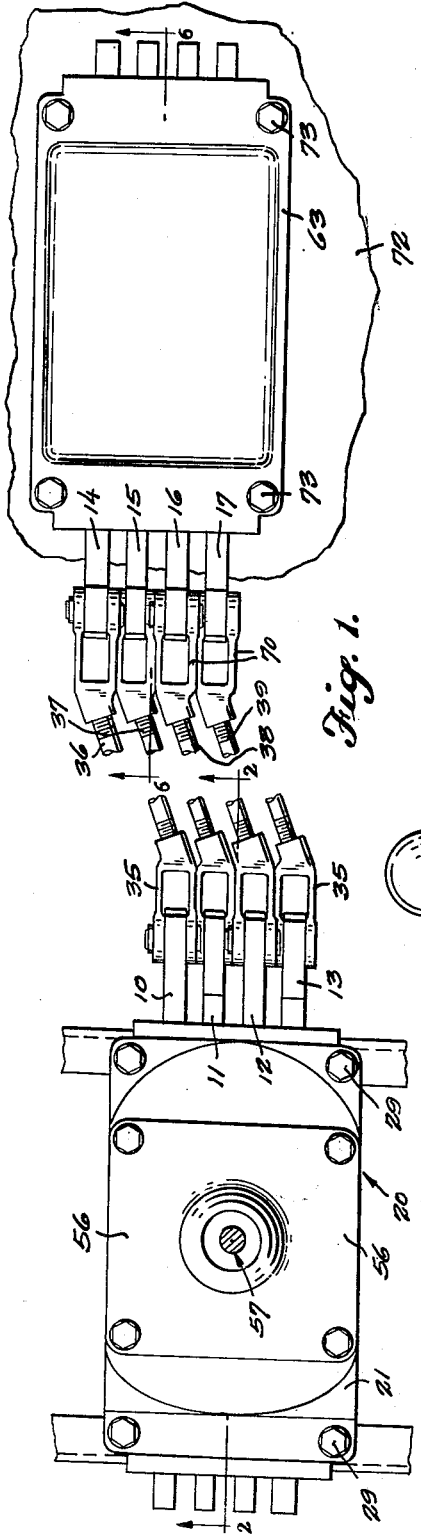
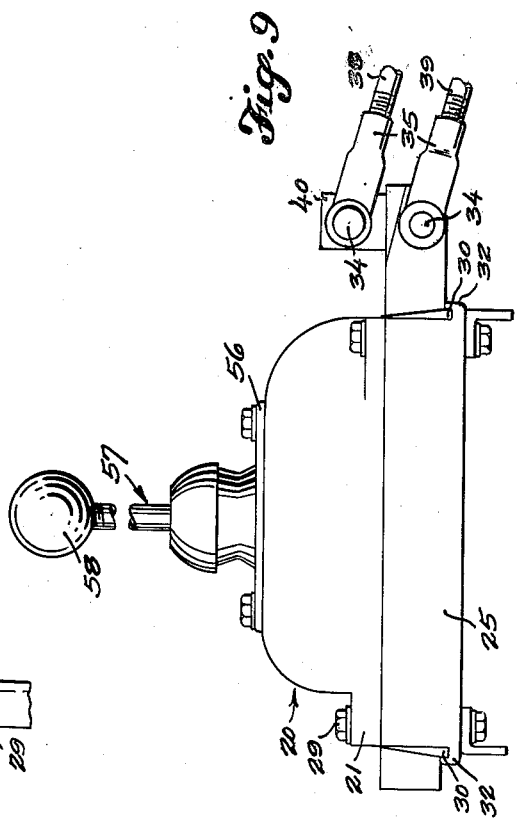
INVENTOR.
Chester Drozynski
BY
ATTORNEY

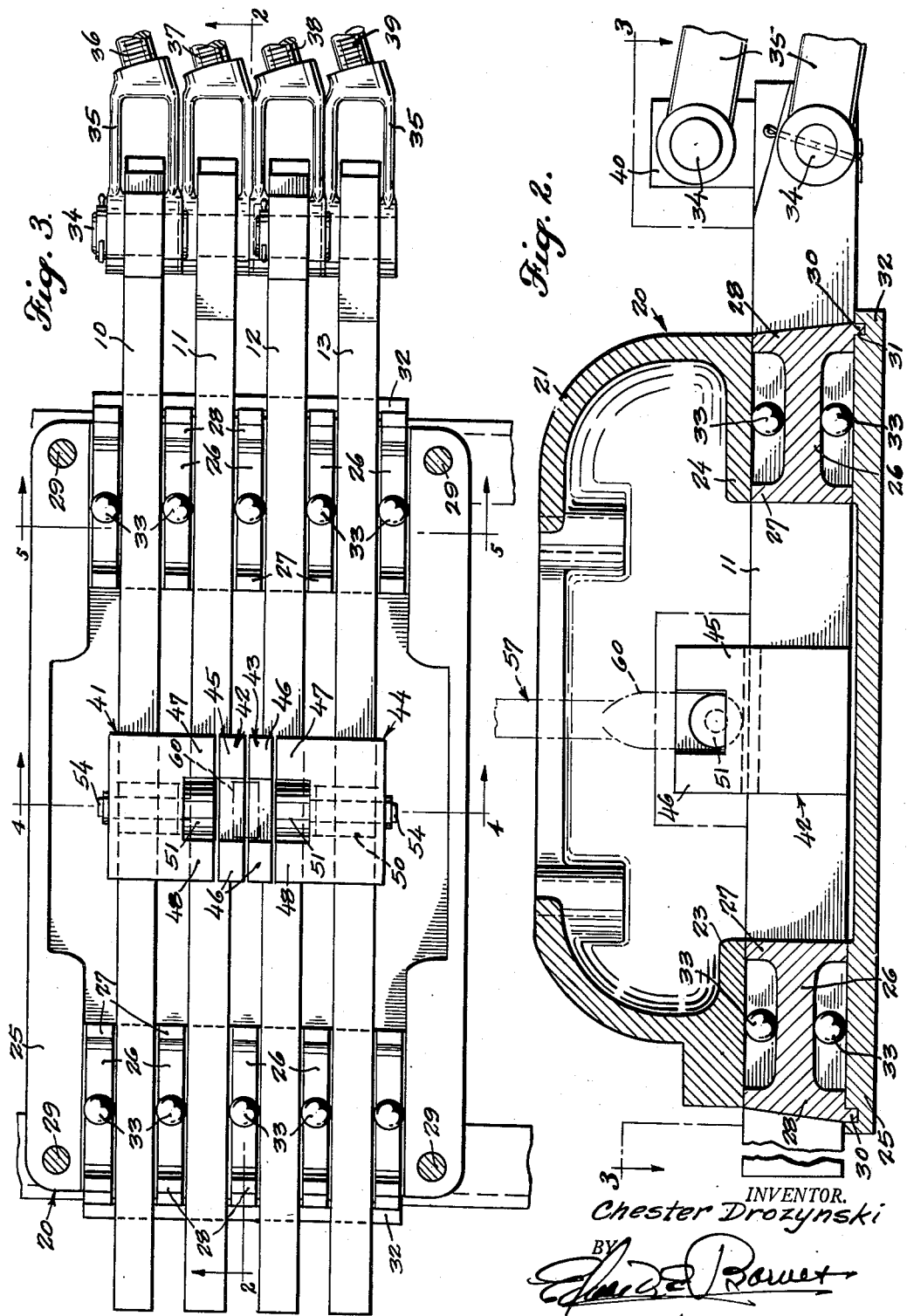

June 8, 1954
C. DROZYNSKI
2,680,657
TRANSMISSION GEAR-SET SLIDE MOUNTING
Filed March 11, 1950
4 Sheets-Sheet 3
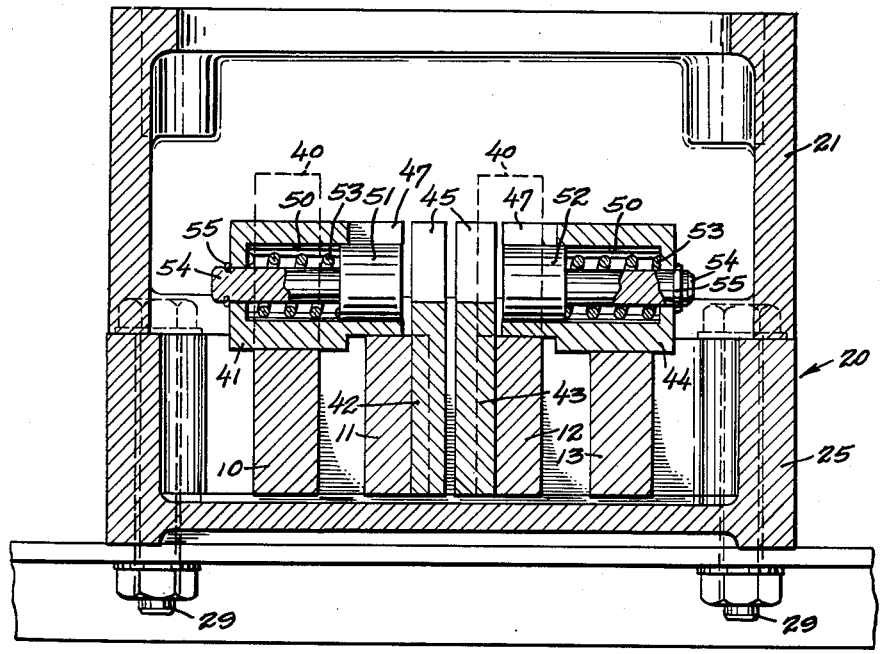
Fig. 4.
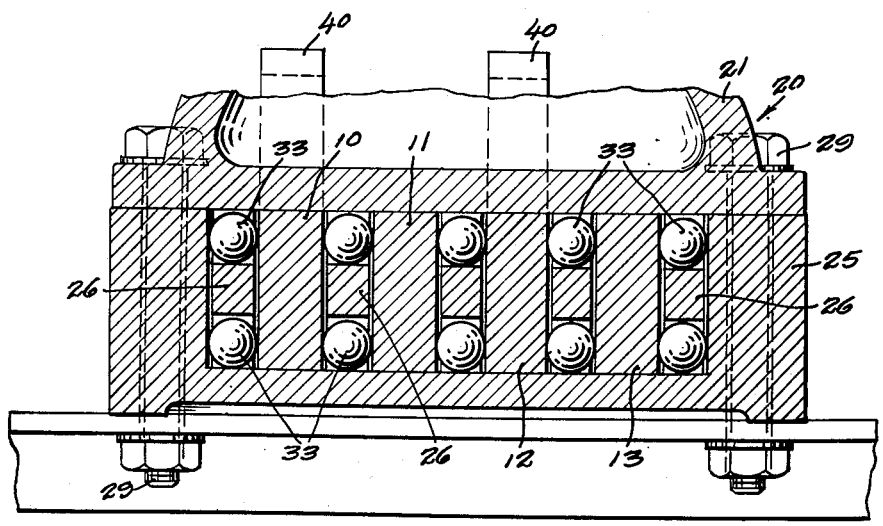
Fig. 5.
INVENTOR.
Chester Drozynski

June 8, 1954          C. DROZYNSKI          2,680,657

TRANSMISSION GEAR-SET SLIDE MOUNTING

Filed March 11, 1950          4 Sheets-Sheet 4

INVENTOR.
Chester Drozynski

BY

ATTORNEY

Patented June 8, 1954

2,680,657

UNITED STATES PATENT OFFICE 2,680,657

TRANSMISSION GEAR-SET SLIDE MOUNTING

Chester Drozynski, Seattle, Wash., assignor to Kenworth Motor Truck Corporation, Seattle, Wash., a corporation of Washington Application March 11, 1950, Serial No. 149,108

6 Claims. (Cl. 308—6)

This invention relates to remotely controlled gear-shifting mechanisms for motor vehicle transmissions, and particularly mechanisms applied to that type of transmission in which the gear-sets within the transmission are conditioned by a set of selectively operable rails mounted for endwise movement along parallel axes. The general object is to devise an improved remote control in which the action necessary to transmit gear-set movements to the gear-set rails from a gear-shift lever located in distant relation thereto is transmitted mechanically from functioning counterparts of the rails through respective links related to the rails. It is a further and more particular object to provide a gear-shift mechanism of the described nature peculiarized in that the two sets of rails, one activated directly by movements of the gear-shift lever and the other responsively activated by motion transmitted through the links, are each so journaled as to enable the two rail sets to be mounted in longitudinal planes offset from one another and yet introduce little if any of the binding which can ordinarily be expected to follow from the movement of linked parts working in misaligned slide-ways.

It is a yet further object of the invention to provide an operating interconnection between the gear-shift and the set of rails related thereto which will give to the operator an unusually sensitive "feel" as the lever is moved through the motions necessary to selectively condition the transmission to its various gear-sets.

With these and other still more particular objects and advantages in view, and which will appear and be understood in the course of the following description and claims, the invention consists in the novel construction and in the adaptation and combination of parts hereinafter described and claimed.

In the accompanying drawings:

Figure 1 is a top plan view of the complete assembly.

Fig. 2 is a longitudinal vertical section taken to an enlarged scale on line 2—2 of Fig. 1.

Fig. 3 is a horizontal sectional view on line 3—3 of Fig. 2.

Figs. 4 and 5 are transverse vertical sections taken to an enlarged scale on lines 4—4 and 5—5, respectively, of Fig. 3.

Figure 6:
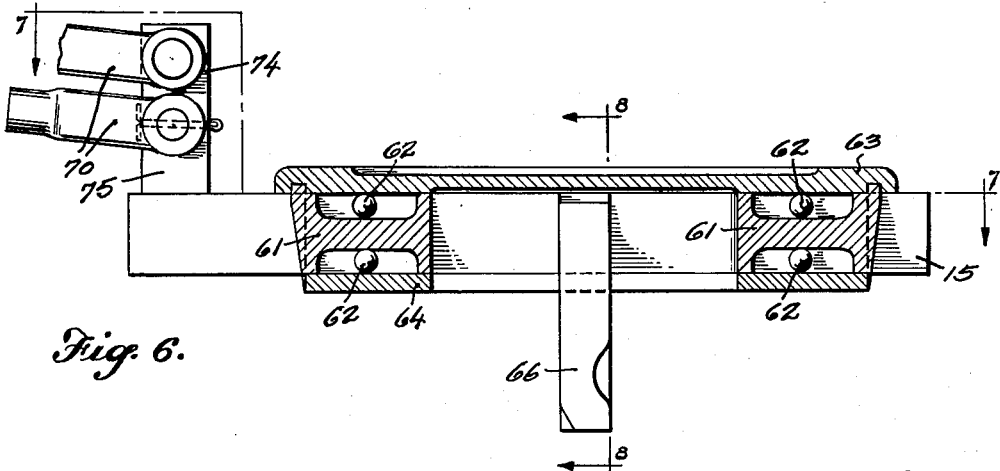

Fig. 6 is a longitudinal vertical section taken to an enlarged scale on line 6—6 of Fig. 1.

Figure 7:
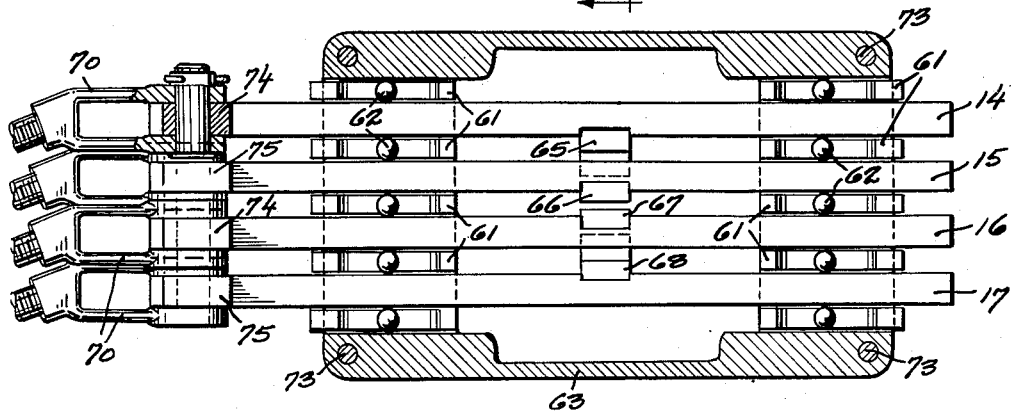

Fig. 7 is a horizontal sectional view on line 7—7 of Fig. 6.

Figure 8:
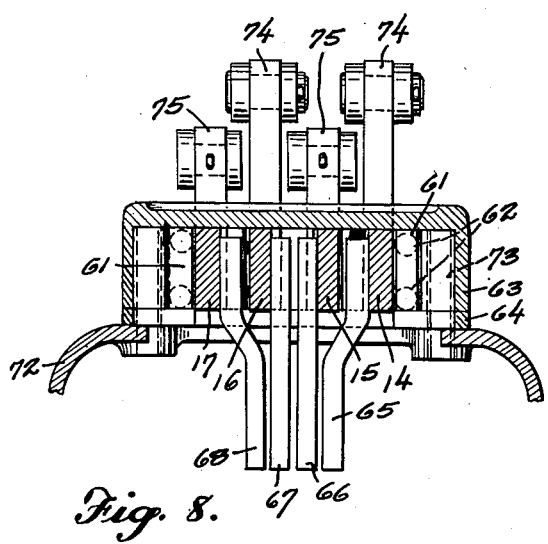

Fig. 8 is a transverse vertical sectional view on line 8—8 of Fig 6; and

Fig. 9 is a fragmentary side elevational view portraying that portion of the remote control assembly shown at the left side of Fig. 1.

Before proceeding with a detailed description of the present invention, clarity in an understanding of the present objectives will perhaps be advanced by here stating that the design of some trucks and busses makes it eminently desirable and in some instances essential that the transmission be located to occupy a position remote or distant from the shift-lever. The transmission normally lies on the longitudinal median line of the vehicle but the exigencies of design frequently require a positioning of the remotely placed shift lever in a longitudinal vertical plane offset laterally to one side of this median. Where such is the case, the use of shifting mechanism embodying sets of correspondingly movable rails at both ends of the motion-transmitting hook-up perforce dictates that the functionally related rails of the two sets must slide along misaligned axes. The problem of binding thus presents itself in that the connecting links, extending oblique to the misaligned axes, introduce force components transverse to the direction of slide. In the absence of compensation for frictional drag along the faces of the slide journals, the shifting action is objectionally stiff. Moreover, as wear takes place, the admissible cocking of the rails within their slide-ways becomes the more pronounced and objectionable binding increases proportionately.

Referring now to said drawings, the sets of rails whcih lie one at the shift-lever end and the other at the transmission end of the assembly are shown in each instance as being four in number and are designated by the numerals 10, 11, 12 and 13 in the instance of the former said set and by 14, 15, 16 and 17 in the instance of the latter said set. To distinguish the rail sets and reflecting the relationship which the rails at the transmission end bear to the rails at the shift-lever end, the rails 14, 15, 16 and 17 will be hereinafter termed the "responding" rails and the rails 10, 11, 12 and 13 will be hereinafter termed the "activating" rails. The several rails in each set are journaled for endwise sliding movement along spaced horizontal axes placed parallel to the longitudinal center line of the vehicle, and providing the slide-ways in which the two sets of rails work are respective housings.

Designated generally by 20 and deriving direct support from the frame of the vehicle, the housing for the activating rails is made in two parts of which the upper part 21 is open to the top and bottom and has comparatively wide web-like flanges 23 and 24 extending along the front and rear edges of the bottom opening. The lower part 25, which connects by bolts 29 to the upper part, is made as a substantial channel section and acts with the undersides of the flanges to produce at both the front and rear of the housing a relatively deep throat of rectangular shape opening into the interior of the housing. Such throats extend very nearly the full width of the housing and are disposed in exact longitudinal alignment, one said throat with the other, and have their facing floor, side and ceiling surfaces finished smooth.

A set of five strip-type separators are fitted in each of said throats to occupy positions at each end limit thereof and at equidistantly spaced intervals of the width. Viewed from the side, these separators are each formed to the shape of a letter H to provide a horizontal cross-arm 26 extending as a spanner between two vertical legs 27 and 28. The separators fit rather snugly between the ceiling and floor walls of the throat, and are held against endwise displacement by the provision of a pendant toe 30 finding engagement in a mating slot 31 cut transversely in a lip prolongation 32 of the housing. Considered as to purpose, the term "separator" as applied to the H-shaped members is perhaps a misnomer in that each said member functions as a cage defining two open-sided pockets, one above and the other below the cross-arm 26, serving as race-ways for a respective steel ball 33. The diameter of the balls approximates the height and slightly exceeds the width of these pockets.

Reverting now to the activating rails 10, 11, 12 and 13, the same are sectionally of a rectangular shape and fit in the interstice between said separators with their top and bottom edges bearing against the ceiling and floor surfaces, respectively, of the throats and their side edges bearing against the caged balls, their lengths being such as to project by the two ends fore and aft of the housing. On the aft end, assuming that the transmission lies to the rear of the gear-shift lever, each said rail is arranged and adapted to connect by a pin 34 with the terminal fork 35 of a respective one of several motion-transmitting links, as 36, 37, 38 and 39. Upstanding ears 40 are formed upon alternate such rails and serve the self-evident end of placing the connecting adjacent links in staggered planes for purposes of clearance.

Welded in surmounting relation upon the rails at a point more or less central to the length, thus to occupy a position within the housing, is a respective lug. The lugs for the inner said rails, designated by 42 and 43, are given an inward offset relative to the rails to have the same lie in close proximity at opposite sides of the transverse median line of the housing and are made furcate at the upper ends, the two horns 45 and 46 which are thereby produced lying in longitudinal alignment one to the front and the other to the rear. The lugs for the outer rails are denoted by 41 and 44 and are made with a furnace over-hang at the top describing, in each instance, two horns, as 47 and 48, projecting horizontally inwardly over the adjacent inner rail into close proximity to the upstanding horns of the latter. In the neutral position of the rails the slots described between the two horns of the several rails line up in a transverse direction and collectively describe a box opening of substantial rectangular shape. Leading outwardly from the end walls of this box opening the outer said lugs 41 and 44 are each bored and counter-bored horizontally on a transverse axis, and there is fitted for sliding movement in each of the counter-bores 50 a respective plunger, as 51 and 52. A respective spring 53 urges the plungers inwardly, and operating to limit this spring-urged travel to a point whereat the inner face of the plunger normally lies flush with the inner limit of the horizontal horns 47 and 48 is a tongue-bolt 54 having its rear end, which extends through the bore and is exposed to the outer side of the related lug, fitted with a snap-ring 55.

There is applied to the housing 20 a cover 56 providing the socket usual to a shift-lever assembly, and receiving its mounting in this socket is a conventional shift lever 57 the upper exposed end 58 of which is operable by hand and the lower end 60 of which depends into the housing and there enters the box opening described by the horns of the rail-carried lugs. Considered in horizontal section the shape of said lower end 60 is rectangular, generally of a size corresponding to but slightly smaller than the slot described between upstanding horns of each of the inner rails 11 and 12.

The significance of the spring-urged plungers, set as they are to have the inner face of each plunger normally lie flush with the end limit of a related pair of the spaced horns 47 and 48, is that it gives the operator an unusually sensitive feel assuring accurate location of the end 60 of the shift lever for imparting endwise movement to a selected one of the four rails 10, 11, 12 and 13. This is to say that the operator, if he wishes to shift the inner rails 11 or 12, moves the shift lever laterally until the same meets the plunger 51 or 52, as the case may be. Being able to "feel" this contact, the operator then imparts longitudinal movement to the shift lever with assurance that the activating end 60 is properly located to effectuate a responsive movement of the inner rail. Should he desire to shift either outer rail 10 or 13, the shift lever is pushed laterally with sufficient force to compress the spring, and in this instance the contact of the activating end 60 with the end limit of the box opening signifies proper location for effectuating a shifting of the concerned outer rail. Any need for "hunting" the inner shift position is effectively eliminated.

Proceeding now to a description of the responding rails 14, 15, 16 and 17, the manner of mounting the same for friction-free endwise sliding movement is much the same as that heretofore described for the activating rails, and which is to say that the rails bear by their side faces against steel balls working in race-ways which are open to the sides and closed at the ends. The cages which produce said race-ways are in this instance denoted by 61, and the associated steel balls by 62. As a housing for the responsive rails, there is employed a channel section 63 at the top constituting a substantial inverted counterpart of the channel section 25, and a flat plate 64 is provided at the bottom, this flat plate having a center opening through which pendant fingers 65, 66, 67 and 68, one for each of the several rails 14, 15, 16 and 17, extend into the transmission case to condition the gear-sets of the latter. The said channel section 63 and plate 64 connect one to another and to the transmission case 72 by bolts 73, replacing the usual cover plate which carries the gear-shift lever. Upstanding ears, as 74 and 75, vertically offset as between adjacent rails in the same degree as the ears 40, are formed upon exposed ends of the rails to admit of connection with fork-ends 70 provided upon the rear extremities of the links 36, 37, 38 and 39.

It is thought that the invention, and its advantages, will have been clearly understood from the foregoing detailed description of the preferred illustrated embodiment. The structure perforce admits to some changes in the details of construction and these changes may be resorted to without departing from the spirit of the invention. While most of the changes to which the invention admits will probably suggest themselves, one embodiment somewhat different from that which I have illustrated should, perhaps, be expressly referred to. The arrangement which I have in mind is one which employs a set of rails of circular cross-section with each said rail being splined for non-rotary endwise movement. In an assembly of this nature ball-bearing journals would desirably be provided at spaced intervals throughout the entire circumference of each rail. It is my intention that no limitations be implied and that the hereto annexed claims be given a scope fully commensurate with the broadest interpretation which the employed language permits.

I claim:

1. In a slide mounting, a housing providing aligned and communicating rectangular throats at the opposite ends thereof each provided along the sides with an oblong pocket extending longitudinally of the housing and open to the throat, partitioning members in each of said throats spaced at equidistant intervals of the width to form separated slide-ways and each presenting an oblong pocket open at both sides, balls of a diameter exceeding the depth of said pockets received for rolling movement in a respective said pocket, and rails taking a slide journal in aligned slide-ways of the two throats with their side edges bearing against the balls.

2. In a slide mounting, a housing providing a rectangular throat opening into the interior of the housing, a plurality of partition members each formed to the substantial shape of a letter H in side elevation and disposed to occupy positions at each side of the throat and at equidistantly spaced intervals of the width to define slide-ways therebetween, friction-relieving balls for each of said partitions having a diameter exceeding the thickness of the partition and received for rolling movement above and below the cross-arm of the H, and respective rails taking a slide journal in said slide-ways with their side edges bearing against the balls.

3. Structure according to claim 2 in which the housing is comprised of separable members one of which is channel-shaped to form both of the side walls and a floor wall of the throat.

4. Structure according to claim 3 in which one of said separable members composing the housing presents a cross-slot exposed to the throat, and wherein the partition members are each formed with a toe element arranged to lodge in said slot for anchoring the partition member against endwise movement within the throat.

5. In a slide mounting, a housing providing a rectangular throat provided along the sides with an oblong pocket extending longitudinally of the housing and open to the throat, partitioning members received in said throat and spaced at intervals of the width to form separated slide-ways and characterized in that each of said members presents an oblong pocket open at both sides, balls of a diameter exceeding the depth of said pockets received for roller movement in a respective said pocket, and a respective rail taking a slide journal in each of said slide-ways with its side edges bearing against the balls.

6. Structure according to claim 5 in which the housing is comprised of separable boltably interconnected members one of which presents a cross-slot exposed to the throat, and wherein the partition members are each formed with a toe element arranged to lodge in said cross-slot for anchoring the partition member against endwise movement within the throat.

References Cited in the file of this patent

UNITED STATES PATENTS

| Number | Name | Date |
|---|---|---|
| 505,400 | Grugin | Sept. 19, 1893 |
| 882,091 | Balloco | Mar. 17, 1908 |
| 1,389,287 | Asprooth | Aug. 30, 1921 |
| 1,519,420 | Ross | Dec. 16, 1924 |
| 1,537,828 | Jones | May 12, 1925 |
| 1,543,754 | Donon | June 30, 1925 |
| 1,831,194 | Radford | Nov. 10, 1931 |
| 1,973,332 | Church | Sept. 11, 1934 |
| 2,177,964 | Thompson | Oct. 31, 1939 |
| 2,301,448 | Peterson et al. | Nov. 10, 1942 |
| 2,370,861 | Jakeway | Mar. 6, 1945 |
| 2,465,885 | Koster | Mar. 29, 1949 |
| 2,472,593 | King | June 7, 1949 |
| 2,538,653 | Perkins | Jan. 16, 1951 |